(12) United States Patent
Tanaka et al.

(10) Patent No.: US 6,552,893 B2
(45) Date of Patent: Apr. 22, 2003

(54) CAPACITOR

(75) Inventors: Yutaka Tanaka, Toyama (JP); Susumu Matsumoto, Toyama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/986,071

(22) Filed: Nov. 7, 2001

(65) Prior Publication Data

US 2002/0054469 A1 May 9, 2002

(30) Foreign Application Priority Data

Nov. 8, 2000 (JP) ........................................ 2000-340017

(51) Int. Cl.[7] ................................................. H01G 4/00
(52) U.S. Cl. ............................... 361/301.3; 361/306.1; 361/306.3; 361/301.5; 361/308.2
(58) Field of Search ......................... 361/301.3, 306.1, 361/539, 540, 511, 523, 529, 301.5, 306.2, 308.2, 301.2

(56) References Cited

U.S. PATENT DOCUMENTS

| | | | | |
|---|---|---|---|---|
| 4,757,414 A | * | 7/1988 | Barker et al. | 361/15 |
| 5,019,934 A | * | 5/1991 | Bentley et al. | 361/15 |
| 5,381,301 A | * | 1/1995 | Hudis | 361/275.2 |
| 5,412,532 A | * | 5/1995 | Nishimori et al. | 361/306.1 |
| 5,805,411 A | * | 9/1998 | Anderson | 361/306.1 |
| 6,233,133 B1 | * | 5/2001 | Weng | 361/301.3 |

FOREIGN PATENT DOCUMENTS

JP          11186091      *  7/1999

* cited by examiner

*Primary Examiner*—Anthony Dinkins
*Assistant Examiner*—Nguyen Ha
(74) *Attorney, Agent, or Firm*—Wenderoth, Lind & Ponack, L.L.P.

(57) ABSTRACT

A capacitor comprising a capacitor element, a case for housing the capacitor element, and a fixing section having projections for attaching the case to electrical equipment. In an exemplary embodiment of the present invention, the case and the fixing section are unitarily molded. The fixing section and the capacitor case are formed of flame-resistant thermoplastic resins as required. This structure eliminates the need of components and tools for fixing the capacitor. Thus, the structure can improve workability, and reduce man-hours and manufacturing cost.

19 Claims, 10 Drawing Sheets ively decreased.
CAPACITOR

FIELD OF THE INVENTION

The present invention relates to a capacitor for use with electrical equipment for such purposes as operating a motor, improving a power factor, charging and discharging, and smoothing.

BACKGROUND OF THE INVENTION

As shown in FIG. 9, typical capacitor 101 comprises capacitor case 102 formed of plastics, capacitor element 106 having terminals 104 for external connection connected thereto, and filling resin injected into the gaps between capacitor case 102 and capacitor element 106 and cured. Conventionally, in order to incorporate capacitor 101 into electrical equipment, attaching sections 103 unitarily molded with capacitor case 102 have been provided at the bottom of capacitor case 102. Attaching sections 103 are provided in horizontal relationship with the attaching plane. Moreover, capacitor 101 is fixed by attaching attaching sections 103 to attachment 105 made of a metal plate, resin plate, wood and the like, using screws 107, as shown in FIG. 10. Fixing using screws 107 is not only made at one point, but also may be made at a plurality of points as required.

In the above-mentioned conventional structure, however, fixing using screws 107 is necessary when capacitor case 101 is attached to attachment 105. This poses a problem of requiring excessive time and man-hours, or more manufacturing cost in the process of assembling electrical equipment to which capacitor 101 is incorporated. Especially when the attaching screw is different from screws for other components, the number of screw types is increased. Therefore, the burden on the personnel is increased in manufacturing and controlling the equipment.

In addition, because change of screws involves change of screwdriver heads in operations, a large number of screw types increase the frequency of troublesome operations for the exchange of the screwdriver heads. Thus labor effectiveness is considerably decreased.

In turn, similar troublesome operations are required when the capacitor is removed.

Conventionally, elimination of the screwing step has strongly been requested from the demands on designing electrical equipment, reducing manufacturing cost, simplifying the manufacturing process, and the like.

In addition, because the terminals are exposed with conventional capacitors, entry of such contaminants as water and dust may lead to corrosion and imperfect contact of the terminals when the capacitors are operated in bad environment such as high temperature and high humidity. For these reasons, improvements for preventing these problems are desired.

The present invention is directed to address such problems.

SUMMARY OF THE INVENTION

A capacitor in accordance with the present invention comprises a capacitor element, a case for housing the capacitor element, and a fixing section having projections for attaching the case to electrical equipment. In an exemplary embodiment of the present invention, the case and the fixing section are unitarily molded. The fixing section and capacitor case are formed of flame-resistant thermoplastic resins as required.

A capacitor in accordance with the present invention also has an adapter as an exemplary embodiment of the fixing section and the adapter has at least one projection. As an exemplary embodiment of the adapter, the adapter is integrated with a case by adhesion, welding or fitting.

DESCRIPTION OF THE PREFERRED EMBODIMENTS

Figure 1A:
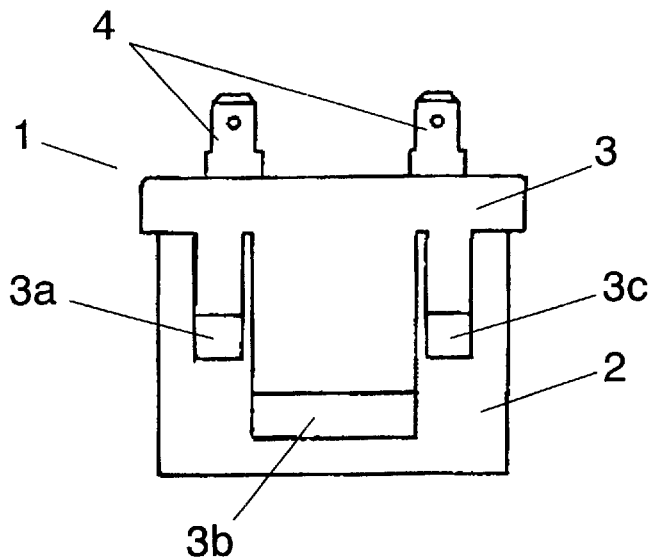
FIG. 1A is a front view of a capacitor in accordance with a first exemplary embodiment of the present invention.

A capacitor in accordance with the present invention has a capacitor case for housing a capacitor element, and a fixing section for attaching the capacitor case to an attachment. Because the fixing section has projections unitarily molded with the capacitor case, another fixing member need not be attached to the capacitor case. When the capacitor in accordance with the present invention is fixed to the attachment, recesses or punched portions arbitrarily designed and machined in the attachment so as to receive the projections facilitates the fixing. This structure eliminates the need of such components as screws and such tools as a screwdriver in assembling, and thus has the effect of facilitating fixing of the capacitor.

A capacitor in accordance with the present invention has an adapter with projections for attaching a capacitor case to an attachment. In this structure, the adapter and the capacitor case are molded separately and excellent moldability can be obtained because molding conditions appropriate for each material can be selected. In addition, the molding dies are inexpensive. By selecting an appropriate means for joining the adapter and the capacitor case, necessary and sufficient strength equivalent to that of an unitarily molded one can be obtained. Also in this case, recesses or punched portions arbitrarily designed or machined in the attachment so as to receive the projections enables fixing, and the capacitor can easily be fixed without the use of such components as screws and such tools as a screwdriver.

With a capacitor in accordance with the present invention, an adapter with projections is integrated with a capacitor case by adhesion, welding or fitting. With this structure, the adapter can easily be integrated with the capacitor case within a short period of time and the strength equivalent to that of an unitarily molded one can be ensured. Also in this case, recesses or punched portions arbitrarily designed or machined in the attachment so as to receive the projections enables fixing, and the capacitor can easily by fixed without the use of such components as screws and such tools as a screwdriver.

With a capacitor in accordance with the present invention, the adapter and the capacitor case are formed of flame-resistant thermoplastic materials. This feature can prevent the capacitor from catching fire from external origins and improve safety.

A capacitor in accordance with the present invention has terminals for external connection and is configured so that the adapter covers the terminals. Because of this structure, the capacitor has both dust-proof and waterproof functions.

The adapter of a capacitor in accordance with the present invention has a U-shaped bend and at least one projection on the bend. This structure eliminates the need of screwing in fixing the capacitor to an attachment, thus providing excellent workability. Moreover, by moving the U-shaped section to release the engaged projection, the adapter can easily be removed without the use of special tools.

The adapter of a capacitor in accordance with the present invention has resilient sections with projections. The resilient sections are structured so that restoring force is exerted thereto while the adapter is attached to the attachment. This can increase the fixing force of the capacitor.

The fixing section of a capacitor in accordance with the present invention has a plurality of projections. With this structure, the attaching position can be changed according to the size of the capacitor to be incorporated, and the fixing section can be shared by many kinds of capacitor elements of different sizes.

Exemplary embodiments of the present invention are hereinafter described with reference to the accompanying drawings.

First Embodiment

Figure 1B:
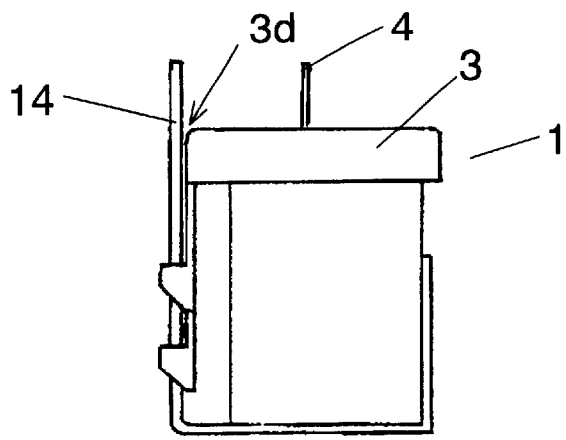
FIG. 1B shows how the capacitor in accordance with the first embodiment of the present invention is attached to a attachment.
Figure 1C:
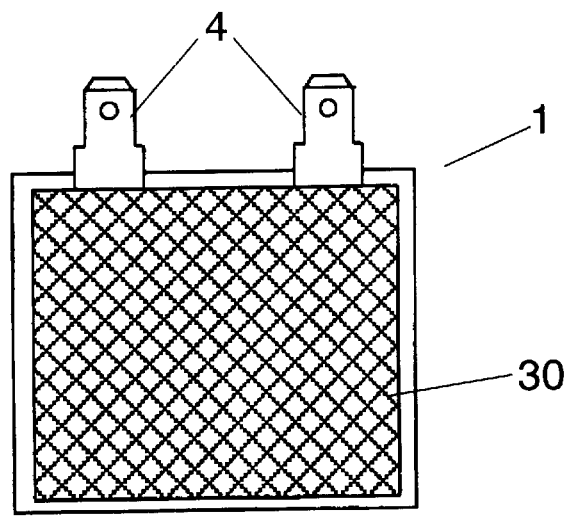
FIG. 1C is a cross sectional view of the capacitor showing a capacitor element in accordance with the first embodiment of the present invention.

FIG. 1A is a front view of a capacitor; FIG. 1B is a side view showing how the capacitor is attached to an attachment: and FIG. 1C is a cross sectional view of the capacitor showing a capacitor element.

Capacitor case 2 (hereinafter referred to as a "case") and projections 3a, 3b and 3c shown in FIG. 1A are unitarily molded of a flame-resistant resin material. A specific resin material is polybutylene terephthalate (PBT), which is a thermoplastic material corresponding to United States of America flammability standard (V-0 in the vertical flammability test specified by UL 94).

Inside of the case 2, capacitor element 30 having terminals 4 for external connection attached thereto is housed. Epoxy resin satisfying the above flame-resistance (UL, V-0) is poured into the gaps between case 2 and capacitor element 30, and cured.

Figure 2:
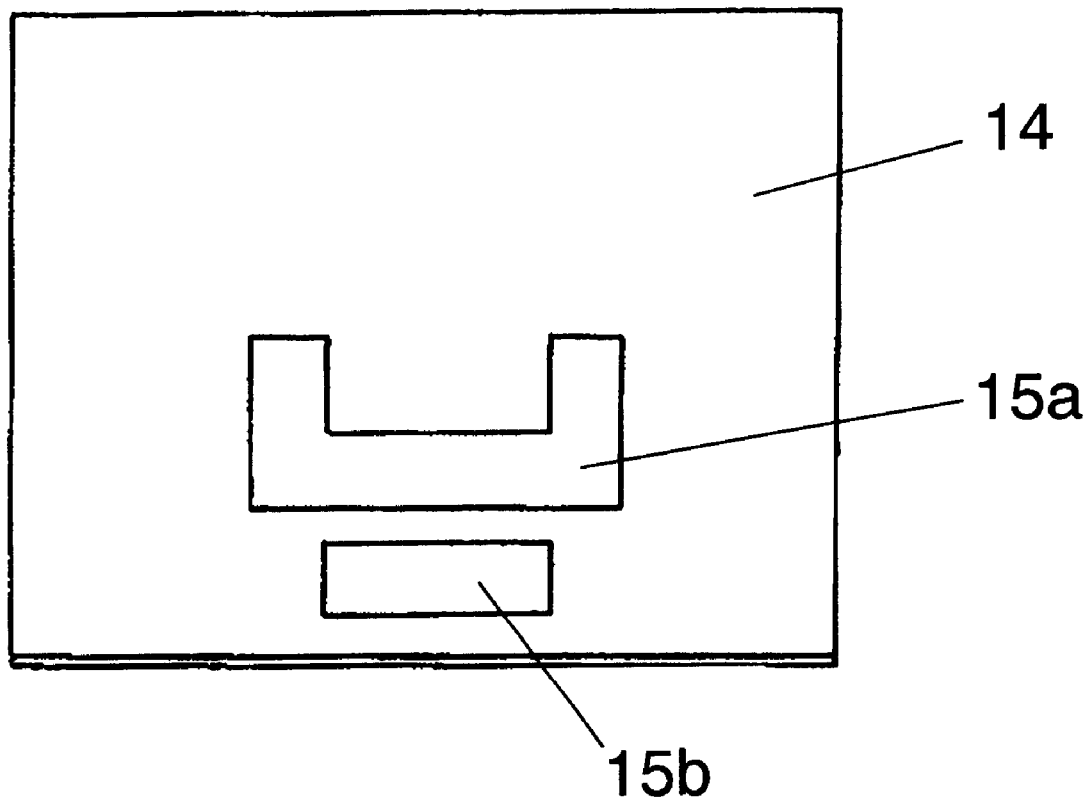
FIG. 2 is a front view of an attachment in accordance with the first embodiment of the present invention.

FIG. 2 is a front view of attachment 14 to which the capacitor is attached. Iron made attachment 14 has cutouts 15a and 15b designed to have shapes and sizes such that projections 3a, 3b and 3c fit into the cutouts.

By pressing down capacitor 1 from the top of attachment 14, projections 3a and 3c fit into cutout 15a and projection 3b fits into cutout 15b, and thus capacitor 1 can be fixed to attachment 14, as shown in FIG. 1B.

In this embodiment, because case 2 and fixing section 3 are unitarily molded, no clearance exists between them and gap 3d exists between fixing section 3 and attachment 14.

This structure eliminates the need of such components as screws and such tools as a screwdriver for fixing. Thus, the structure can improve workability, and reduce man-hours and manufacturing cost.

The material of case 2 is not limited to PBT. Any plastic materials having the above flame-resistance, such as polypropylene (PP), polycarbonate (PC), and polyamide (PA), can be used.

No specific limitations are imposed on the direction, position, shape, number, size and the like of the projections to be formed. The projections can be designed according to a request.

Also, material of attachment 14 is not limited to a metal plate. The attachment can be made of such materials as plastics and wood. The attachment should have a size and strength enough to support projections 3a, 3b and 3c.

The attaching direction of the capacitor is not limited to that of this embodiment on condition that projections 3a, 3b and 3c can firmly be fitted into attachment 14. Vertical direction or reversed direction can give the same effects. In accordance with this embodiment, such components as screws and such tools as a screwdriver are unnecessary for fixing. This feature facilitates fixing of the capacitor and can provide excellent workability, reduce man-hours, and enhance reliability.

Second Embodiment

In the description of this embodiment, components similar to those in the first embodiment have the same reference numerals, and the descriptions of those components are omitted.

Figure 3A:
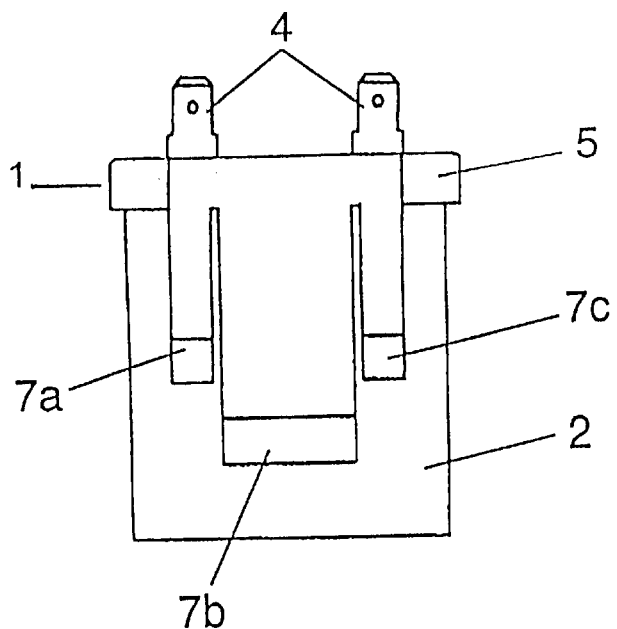
FIG. 3A is a front view of a capacitor in accordance with a second exemplary embodiment of the present invention.
Figure 3B:
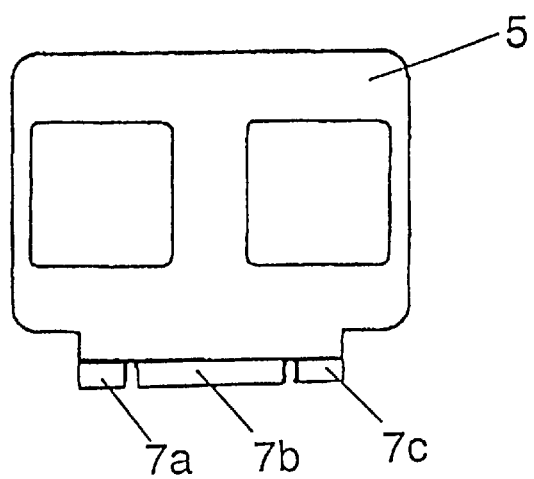
FIG. 3B is a plan view of an adapter of the capacitor in accordance with the second embodiment of the present invention.
Figure 3C:
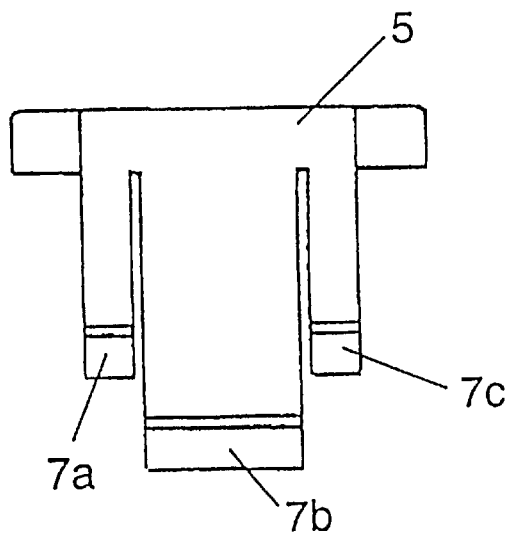
FIG. 3C is a front view of the adapter of the capacitor in accordance with the second embodiment of the present invention.

FIG. 3A shows capacitor 1 in which adapter 5 with projections 7a, 7b and 7c (see FIG. 3C) formed of a flame-resistant polypropylene is provided, fitted onto capacitor case 2 from the top thereof, and integrated with capacitor case 2 using ultrasonic welding.

Figure 4A:
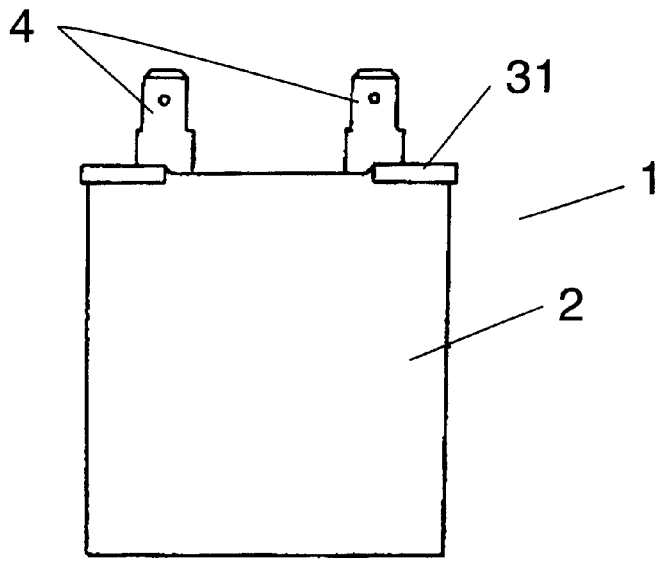
FIG. 4A is a front view of the capacitor in accordance with the second embodiment of the present invention that has rims around a capacitor case.
Figure 4B:
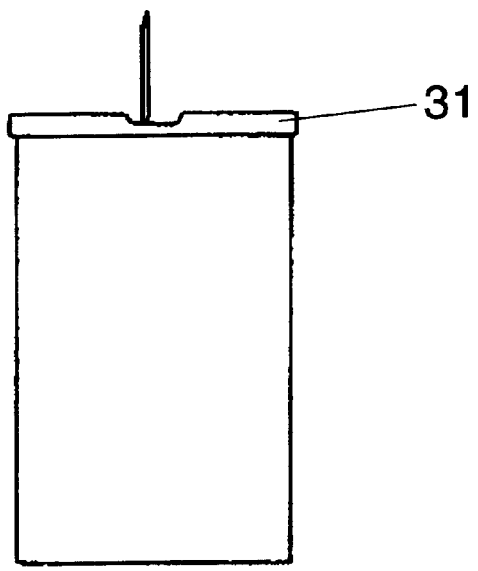
FIG. 4B is a side view of the capacitor in accordance with the second embodiment of the present invention that has rims around the capacitor case.
Figure 4C:
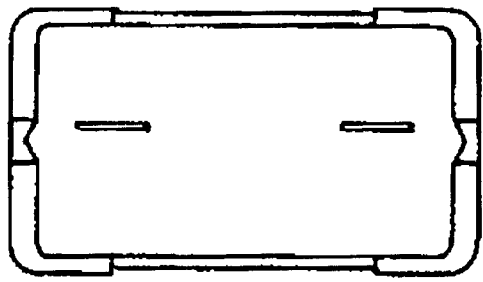
FIG. 4C is a plan view of the capacitor in accordance with the second embodiment of the present invention that has rims around the capacitor case.

In addition, case 2 is previously provided with rims 31 as shown in FIG. 4A, and adapter 5 is fitted onto case 2 from the top thereof and fixed thereto, as shown in FIG. 3A. In this manner, adapter 5 and case 2 are integrated into one unit by the fit between adapter 5 and case 2. In this case, heat welding using ultrasound or fixing using adhesive agent is unnecessary.

Similar to the capacitor in accordance with the first embodiment, the capacitor of this embodiment does not require such components as screws and such tools as a screwdriver in assembling. Therefore, the capacitor is easily be attached to the attachment. This feature can improve workability and reduce man-hours. Moreover, this feature can enhance the reliability of the capacitor, minimize the investment in molding dies, and reduce manufacturing cost.

Third Embodiment

Figure 5A:
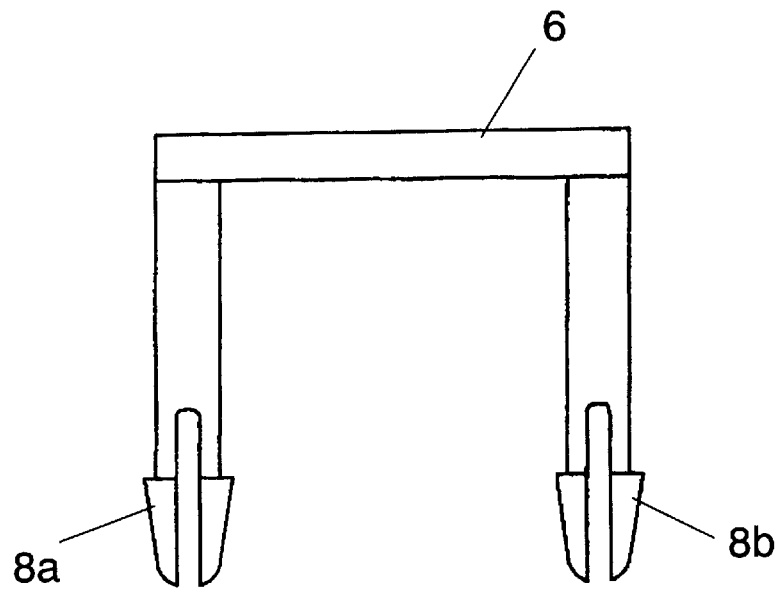
FIG. 5A is a front view of an adapter in accordance with a third exemplary embodiment of the present invention.
Figure 5B:
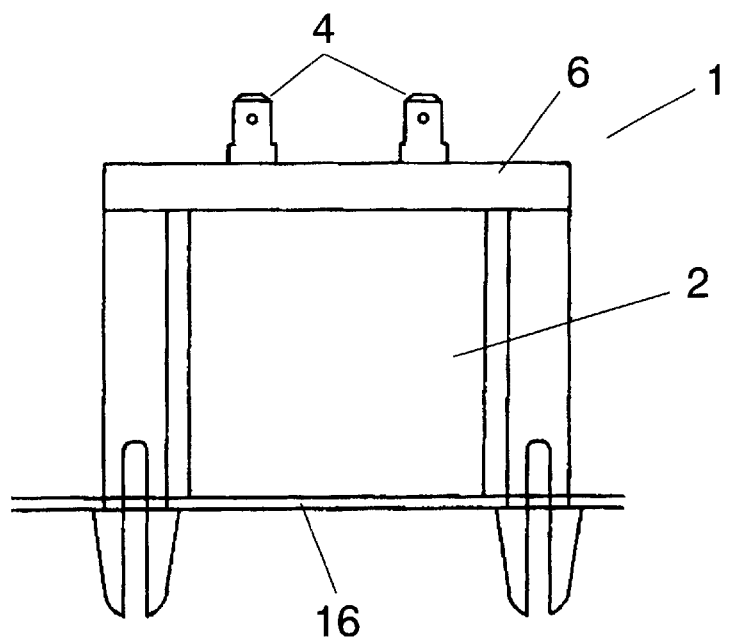
FIG. 5B shows how the adapter in accordance with the third embodiment of the present invention is attached.

FIG. 5A shows adapter 6 having conical projections 8a and 8b. Adapter 6 is formed of a flame-resistant polypropylene. FIG. 5B shows that adapter 6 is integrated with case 2 by adhesion and inserted from the top of aluminum attachment 16 and fixed thereto. Attachment 16 is previously provided with through holes into which each of projections 8a and 8b can be inserted. Also in this embodiment, fixing of the capacitor does not require screwing, and this feature can improve workability and reduce man-hours. Moreover, flame-resistance is added to capacitor 1 and reliability can be enhanced.

Fourth Embodiment

Figure 6A:
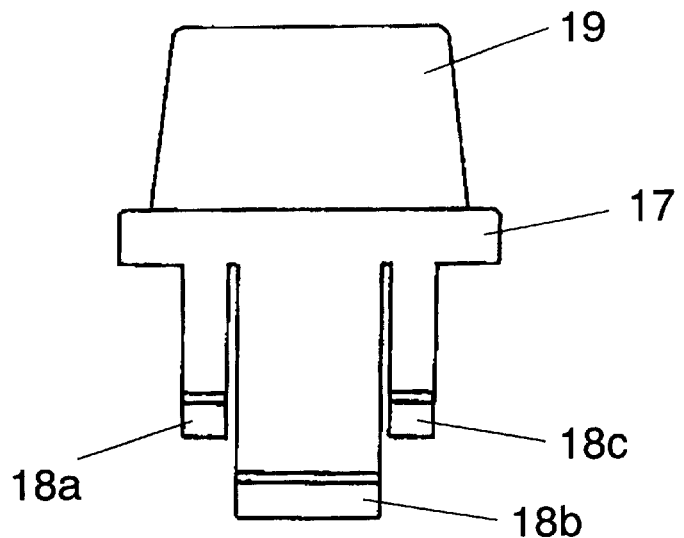
FIG. 6A is a front view of an adapter in accordance with a fourth exemplary embodiment of the present invention.
Figure 6B:
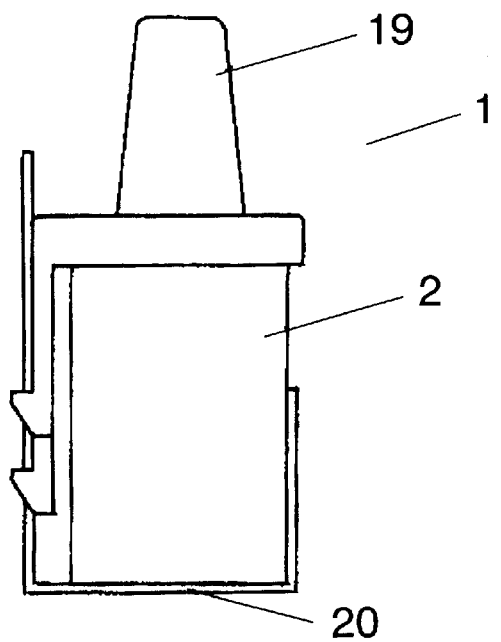
FIG. 6B shows how a capacitor in accordance with the fourth embodiment of the present invention is attached.

FIG. 6A shows adapter 17 that has projections 18a, 18b and 18c and also has cover 19 provided so as to completely cover the top of terminals 4 of the capacitor. FIG. 6B shows that capacitor 1 is fixed to iron attachment 20 using adapter 17.

Also in this embodiment, screwing is unnecessary for fixing of the capacitor, and thus this feature can improve workability, reduce man-hours and enhance reliability.

In this embodiment, connecting coated lead wires and the like to the terminals through minimum through holes in cover 19 can provide external electrical connection.

In accordance with this embodiment, the waterproof and dust-proof properties of the capacitor can be improved and the reliability thereof can be further enhanced.

Fifth Embodiment

Figure 7A:
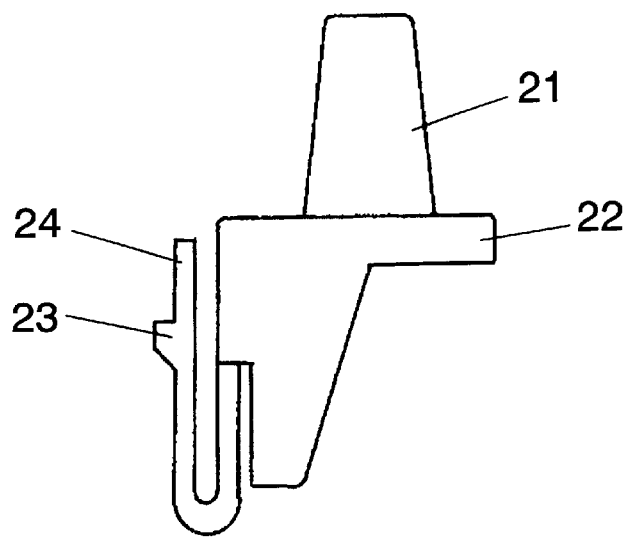
FIG. 7A is a side view of an adapter in accordance with a fifth exemplary embodiment of the present invention.

FIG. 7A shows adapter 22 that has cover 21 completely covering terminals 4, and U-shaped section 24 for facilitating removal of capacitor 1. Adapter 22 is provided with projection 23. In this embodiment, the U-shaped section is inserted into cutout 25a in the attachment from the top thereof to fix case 2 to the attachment. Projection 23 is engaged with retainer 25b in the attachment and fixed thereto.

Also in this embodiment, screwing is unnecessary for fixing of the capacitor, and thus this feature can improve workability, reduce man-hours and enhance reliability.

With this embodiment, tilting down U-shaped section 24 toward adapter 22 can release the fit between projection 23 and attachment 25.

Figure 7B:
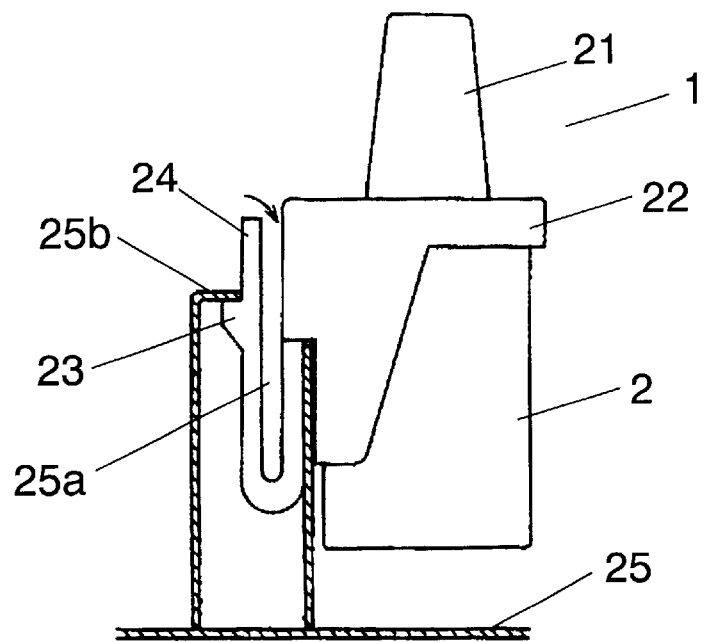
FIG. 7B shows how a capacitor in accordance with the fifth embodiment of the present invention is attached.

In other words, releasing the fit by tilting the U-shaped section in the direction of the arrow shown in FIG. 7B can easily remove capacitor 1 from attachment 25 without using tools and the like.

In addition, connecting coated lead wires and the like to the terminals through minimum through holes in the cover 21 can provide external electrical connection.

In this embodiment, adapter 22 has cover 21; however, cover 21 need not be provided necessarily. Moreover, adapter 22 can be unitarily molded with case 2.

Further, in this embodiment, a U-shaped bent section is described as a releasing and fixing means for the capacitor 1. But a shape of the section is not limited to the U-shape, but other shapes such as V-shape, folded-bar-shape, wave-shape or the like can be used as a shape of the releasing and fixing means.

In accordance with this embodiment, the capacitor can easily be removed with a single motion without using tools, for such purposes as maintenance.

Sixth Embodiment

Figure 8A:
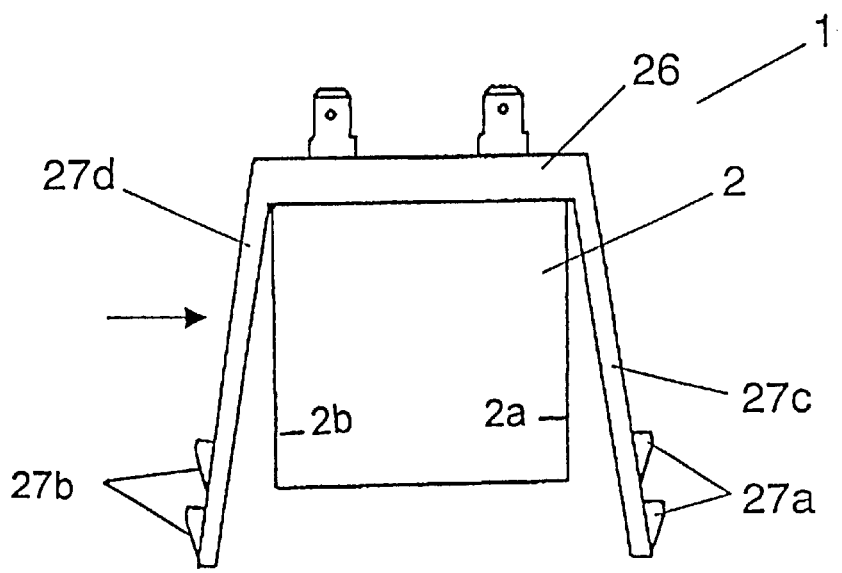
FIG. 8A is a front view of a capacitor in accordance with a sixth exemplary embodiment of the present invention.
Figure 8B:
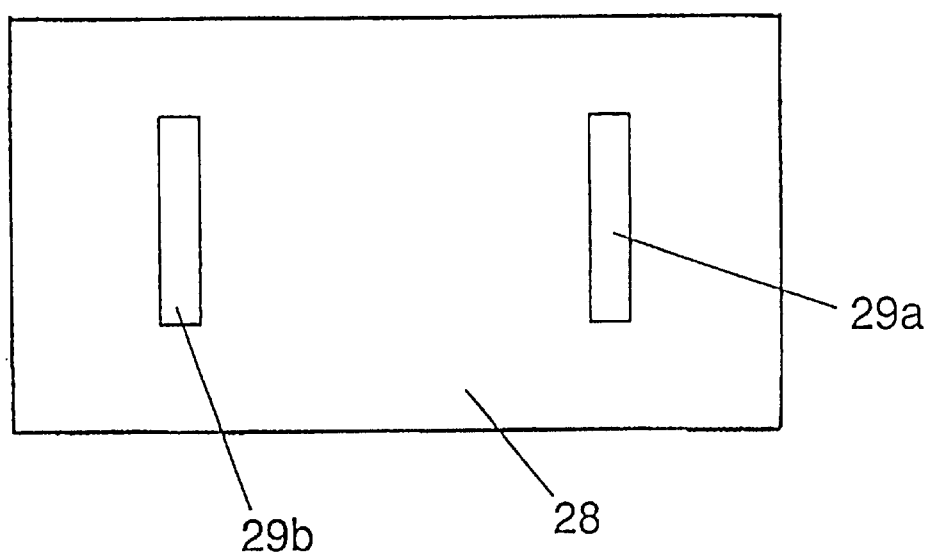
FIG. 8B is a plan view of a attachment in accordance with the sixth embodiment of the present invention.
Figure 9A:
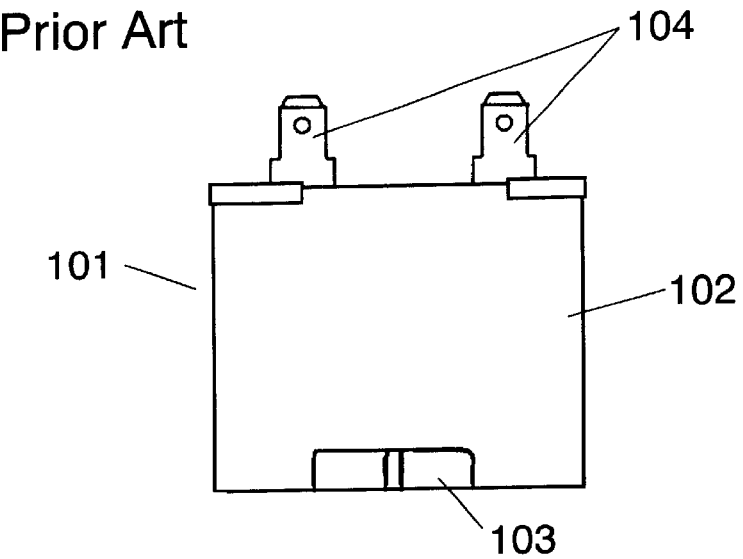
FIG. 9A is a front view of a conventional capacitor.
Figure 9B:
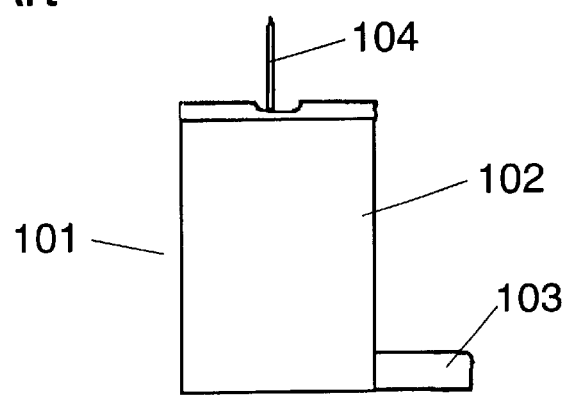
FIG. 9B is a side view of the conventional capacitor.
Figure 9C:
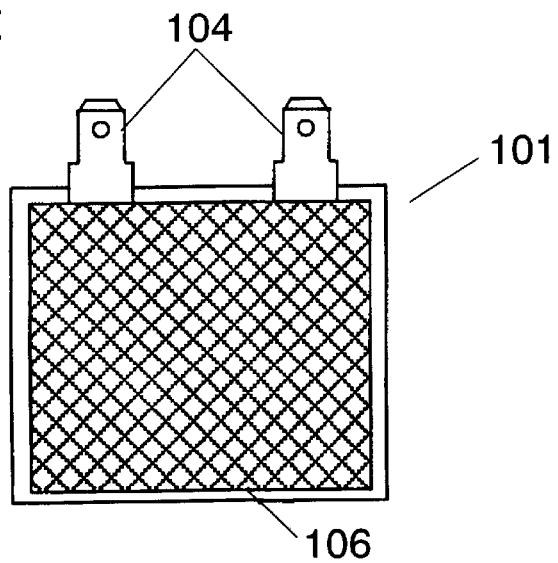
FIG. 9C is a cross sectional view of the conventional capacitor.
Figure 10:
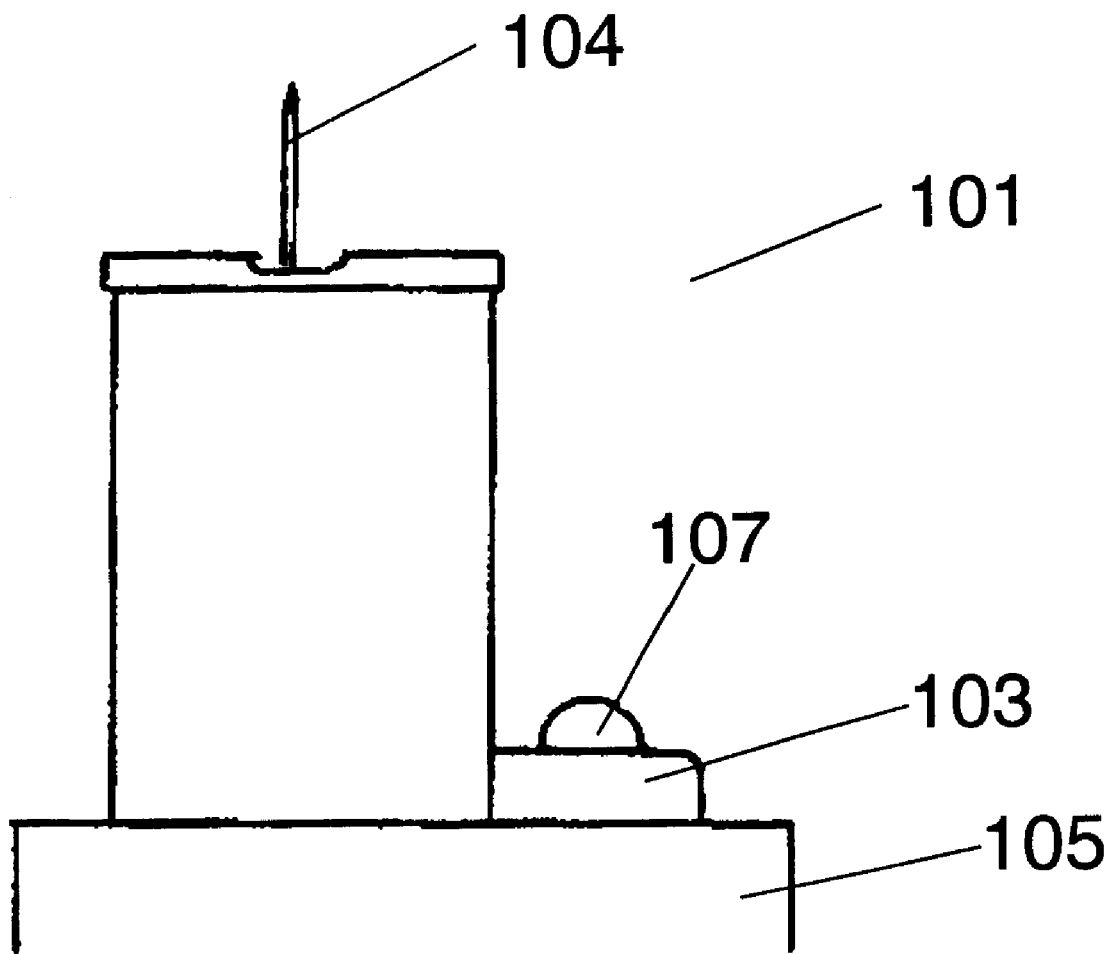
FIG. 10 shows how the conventional capacitor is attached.

FIG. 8A shows a capacitor in which adapter 26 with projections 27a and 27b is fitted onto case 2 from the top thereof and integrated therewith. Resilient sections 27c and 27d having projections 27a and 27b, respectively, are formed so as to be opened downwardly as shown in FIG. 8A. attachment 28 shown in FIG. 8B is previously provided with cutouts 29a and 29b for receiving projections 27a and 27b therein, respectively. The capacitor is inserted from the top of the attachment to fix case 2 thereto. Resilient sections 27c and 27d are configured so as to be substantially in parallel with each other when they are fixed to attachment 28. By attaching the resilient sections 27c and 27d in this manner, restoring force is exerted thereto and this force enables firm fixing of the case to attachment 28.

In accordance with this embodiment, screwing is unnecessary for assembling the capacitor, and thus this feature can improve workability, reduce man-hours and enhance reliability.

Resilient sections 27c and 27d have a plurality of projections 27a and 27b, respectively, as shown in 8A. Such plurality of projections is provided so that adapter 26 can be shared by many kinds of capacitor elements (not shown) of different sizes. In other words, different projections are used and the positions of projections 27a and 27b that the cutouts in an attachment receive can be changes, according to the size of the capacitor element. Such a structure enables sharing one adapter with capacitor elements of different sizes, and thus reduction in material cost.

In this embodiment, adapter 26 and case 2 are formed separately; however they can be formed unitarily.

In accordance with this embodiment, the capacitor can firmly be fixed to attachment 28 using restoring force of resilient sections 27c and 27d. Moreover, since the fixing member (adapter) can be shared by capacitor elements of different sizes, cost reduction can be achieved.

In the above explanation, attaching a capacitor to an attachment is mainly disclosed. But, as is easily understood, the capacitor of the present invention is easily attached to an electronic equipment directly in the same way described above if the equipment is provided with openings or the like means for fixing the capacitor.

What is claimed is:

1. A capacitor for use with a piece of electrical equipment, said capacitor comprising:
   a case;
   a capacitor element disposed within said case;
   a fastener; and
   a projection located on said fastener, said projection including at least a portion that is external to said case,
   wherein said projection is fastenable to the piece of electrical equipment so as to fasten said capacitor to the electrical equipment.

2. The capacitor as set forth in claim 1, wherein said fastener is a fixing section, and
   wherein said case and said fixing section are unitarily formed as a single member.

3. The capacitor as set forth in claim 2, wherein said case and said fixing section are formed of a flame-resistant thermoplastic material.

4. The capacitor as set forth in claim 2, wherein said fixing section comprises a plurality of projections.

5. An electronic device comprising:
   the capacitor as set forth in claim 2; and
   a piece of electrical equipment,
   wherein said projection is fastened to said piece of electrical equipment.

6. The capacitor as set forth in claim 1, wherein said case and said fastener are unitarily formed as a single member, and wherein said fastener comprises a U-shaped portion.

7. The capacitor as set forth in claim 6, wherein said U-shaped portion comprises at least one projection.

8. The capacitor as set forth in claim 1, wherein said fastener comprises an adapter.

9. The capacitor as set forth in claim 8, wherein said adapter is connected to said case with an adhesive.

10. The capacitor as set forth in claim 8, wherein said adapter is connected to said case by a weld.

11. The capacitor as set forth in claim 8, wherein said adapter is connected to said case by a press-fit.

12. The capacitor as set forth in claim 8, wherein said adapter and said case are formed of flame-resistant thermoplastic material.

13. The capacitor as set forth in claim 8, wherein said capacitor further comprises a terminal for external connection, and wherein said adapter covers said terminal.

14. An electronic device comprising:

the capacitor as set forth in claim 8; and a piece of electrical equipment, wherein said projection is fastened to said piece of electrical equipment.

15. An electronic device comprising:

the capacitor as set forth in claim 1; and a piece of electrical equipment, wherein said fastener comprises an adapter, and wherein said projection is fastened to said piece of electrical equipment.

16. A capacitor for use with a piece of electrical equipment, said capacitor comprising:

a case;

a capacitor element disposed within said case;

a fastener; and a plurality of projections located on said fastener, at least one of said projections including at least a portion that is external to said case, wherein said capacitor is fastened to the electrical equipment in a fastening direction by said fastener, and wherein said plurality of projections are provided on said fastener in the fastening direction.

17. The capacitor as set forth in claim 16, wherein said fastener is an adapter.

18. A capacitor and piece of electrical equipment, said capacitor comprising:

a case;

a capacitor element disposed within said case;

a fastener; and at least one projection located on said fastener, one of said at least one projection including at least a portion that is external to said case, wherein said capacitor is fastened to said piece of electrical equipment by said fastener.

19. The capacitor as set forth in claim 18, wherein said fastener is an adapter.

* * * * *

UNITED STATES PATENT AND TRADEMARK OFFICE
CERTIFICATE OF CORRECTION

| | | |
|---|---|---|
| PATENT NO. | : 6,552,893 B1 | Page 1 of 1 |
| APPLICATION NO. | : 09/986071 | |
| DATED | : April 22, 2003 | |
| INVENTOR(S) | : Yutaka Tanaka et al. | |

It is certified that error appears in the above-identified patent and that said Letters Patent is hereby corrected as shown below:

Title page Item (57), amend the abstract as follows:

Line 1, replace "comprising" with --includes--, and insert --capacitor-- directly before the word "case".

In each instance on lines 3 and 4, insert --capacitor-- directly before the word "case".

Line 8, replace "of" with --for--, replace "fixing" with --attaching--, and insert --to an attachment base-- directly after the word "capacitor".

Signed and Sealed this

Second Day of January, 2007

JON W. DUDAS
*Director of the United States Patent and Trademark Office*